US012701057B2

(12) United States Patent (10) Patent No.: US 12,701,057 B2
Mauhourat et al. (45) Date of Patent: Aug. 4, 2026

(54) SYSTEMS AND METHODS FOR INCIDENT REPORTING FROM SECURED DEVICES

(71) Applicant: VeriFone, Inc., Wilmington, DE (US)

(72) Inventors: Arno Mauhourat, Chatou (FR); Melchor Alejandro Varela Morales, Madrid (ES)

(73) Assignee: VeriFone, Inc., Wilmington, DE (US)

( * ) Notice: Subject to any disclaimer, the term of this patent is extended or adjusted under 35 U.S.C. 154(b) by 27 days.

(21) Appl. No.: 18/840,581

(22) PCT Filed: Feb. 28, 2022

(86) PCT No.: PCT/US2022/070859
§ 371 (c)(1),
(2) Date: Aug. 22, 2024

(87) PCT Pub. No.: WO2023/163793
PCT Pub. Date: Aug. 31, 2023

(65) Prior Publication Data
US 2025/0168087 A1     May 22, 2025

(51) Int. Cl.
*H04L 41/5074* (2022.01)
*G16Y 40/10* (2020.01)
(Continued)

(52) U.S. Cl.
CPC .......... *H04L 41/5074* (2013.01); *G16Y 40/10* (2020.01); *H04L 9/0825* (2013.01); *H04L 9/302* (2013.01)

(58) Field of Classification Search
None
See application file for complete search history.

(56) References Cited

U.S. PATENT DOCUMENTS 6,523,141 B1 * 2/2003 Cantrill ............... G06F 11/0778
717/124
9,413,715 B2    8/2016 Chor
(Continued)

FOREIGN PATENT DOCUMENTS

CN          113282459 A      8/2021
WO    WO-2019246402 A1 * 12/2019    ............. H04W 4/02

OTHER PUBLICATIONS

International Search Report and the Written Opinion of the International Searching Authority, PCT Application No. PCT/US2022/70859, pp. 1-8, dated May 20, 2022.
(Continued)

*Primary Examiner* — Phyllis A Book
(74) *Attorney, Agent, or Firm* — Bond, Schoeneck & King, PLLC

(57) ABSTRACT

Methods and systems for incident reporting from secured devices are provided. A method includes detecting an incident on a secured IoT device that disrupts normal operations by the secured IoT device. A preconfigured set of incident data relevant to the incident are collected from the secured IoT device and encrypted based on a preselected cryptosystem. An encoded incident report is generated by combining a URL to a technical support server and the encrypted incident data further encoded into characters. The encoded incident report is produced in a QR code along with a request to scan the QR code via an output interface of the secured IoT device to thereby have the encoded incident report sent to the technical support server by another device that accesses a digital communication network.

18 Claims, 6 Drawing Sheets

(51) Int. Cl.
   H04L 9/08          (2006.01)
   H04L 9/30          (2006.01)

(56)                    References Cited

U.S. PATENT DOCUMENTS

| | | | | |
|---|---|---|---|---|
| 11,522,958 | B1 * | 12/2022 | Pope | H04L 67/12 |
| 2014/0351408 | A1 * | 11/2014 | Anderson | H04L 41/0686 |
| | | | | 709/224 |
| 2015/0178721 | A1 | 6/2015 | Pandiarajan et al. | |
| 2015/0244681 | A1 * | 8/2015 | Blumenfeld | H04L 9/30 |
| | | | | 713/168 |
| 2015/0288682 | A1 * | 10/2015 | Bisroev | G16H 40/20 |
| | | | | 713/172 |
| 2016/0132891 | A1 * | 5/2016 | MacKinnon Keith | |
| | | | | G06Q 30/02 |
| | | | | 705/44 |
| 2016/0283311 | A1 | 9/2016 | Joshi et al. | |
| 2018/0262941 | A1 * | 9/2018 | Huang | H04W 4/08 |
| 2019/0349426 | A1 * | 11/2019 | Smith | H04L 63/123 |
| 2020/0084030 | A1 * | 3/2020 | Nendell | H04L 63/083 |
| 2020/0259647 | A1 * | 8/2020 | Goncalves | H04L 9/3093 |
| 2020/0259848 | A1 * | 8/2020 | Holland | H04W 74/004 |
| 2021/0006933 | A1 * | 1/2021 | Dean | G16Y 40/10 |
| 2021/0192077 | A1 * | 6/2021 | Barcellos | G06F 21/6254 |
| 2021/0392234 | A1 * | 12/2021 | Lowman | H04L 65/65 |
| 2022/0030407 | A1 * | 1/2022 | Bercovici | H04W 48/18 |
| 2022/0158845 | A1 * | 5/2022 | Brownlee | H04L 9/3247 |
| 2023/0085767 | A1 * | 3/2023 | Liao | H04W 4/023 |
| | | | | 348/143 |
| 2023/0091179 | A1 * | 3/2023 | Bari | H04L 9/14 |
| | | | | 713/168 |

OTHER PUBLICATIONS

Communication Pursuant to Rules 70(2) and 70A(2) EPC, EP Patent Application No. 22929188.5, dated Aug. 1, 2025, 1 page.

Supplementary European Search Report, EP Patent Application No. 22929188.5, dated Jul. 15, 2025, pp. 1-10.

Anonymous: "Generating URL's that fill forms on my site—Software Engineering Stack Exchange", Dec. 31, 2014 (Dec. 31, 2014), pp. 1-2, XP093291243, Retrieved from the Internet: URL: https://softwareengineering.stackexchange.com/questions/267758/generating-urls-that-fill-forms-on-my-site [retrieved on Jul. 1, 2025].

Anonymous: "How to Pre-fill Form through URL Parameters—Digital Inspiration", Apr. 16, 2021 (Apr. 16, 2021), pp. 1-3, XP093291356, Retrieved from the Internet: URL: https://web.archive.org/web/20210416202016/https://digitalinspiration.com/docs/file-upload-forms/prefill [retrieved on Jul. 1, 2025].

International Search Report and the Written Opinion of the International Searching Authority, PCT Application No. PCT/US2022/70859, pp. 1-7, dated May 20, 2022.

* cited by examiner

100

500

```
501: SN: 999-145-123
502: Tampered: no
503: Customer: mymerchant
504: Free Flash: flashfs 25MB rootfs:12MB
505: Free RAM: 65 MB
506: Process ID = 2060
507: Signal: Segmentation fault
508: Backtrace:
509: ./backtracehandler_example(signal_handler+0x6b)[0x8b78]
510: /lib/libc.so.6(__default_rt_sa_restorer_v2+0x0)[0xa5450ac0]
511: ./libsegf.so(lib_segfault+0xd)[0xa552e602]
512: ./backtracehandler_example(main+0xc3)[0x8d88]
513: /lib/libc.so.6(__libc_start_main+0x99)[0xa5441fda]
514: Memory map:
515: 00008000-0000a000 r-xp 00000000 00:0d 1933 backtracehandler_example
516: 00011000-00012000 rw-p 00001000 00:0d 1933 backtracehandler_example
517: 00012000-02331000 ---p 00000000 00:00 0
518: 02331000-02353000 rw-p 00000000 00:00 0             [heap]
519: a542a000-a542b000 rw-p 00000000 00:00 0
520: a542b000-a54ff000 r-xp 00000000 00:0d 1207          /lib/libc-2.15.so
521: a54ff000-a5507000 ---p 000d4000 00:0d 1207          /lib/libc-2.15.so
     ...
522: a552e000-a552f000 r-xp 00000000 00:0d 1938
     /usr/share/debugpack/examples/libsegf.so
     ...
523: b0bad000-b0bce000 rw-p 00000000 00:00 0             [stack]
524: b0bce000-bf000000 ---p 00000000 00:00 0
525: Registers:
526: R0: 00000010 R1: 00000001 R2: 00000000 R3: 00000000
527: R4: 00000000 R5: b34deed8 R6: 000086f9 R7: b34deea8
528: R8: 00000000 R9: 00000000 SL: a15cc000 FP: 00000000
529: IP: 00000000 SP: b34deea8 LR: a14eeb77 PC: 0000880c
530: CPSR: 60000030
531: Trap: 0000000e Error: 00000017 OldMask: 00000000
532: Addr: 00000000
```

FIG. 5

SYSTEMS AND METHODS FOR INCIDENT REPORTING FROM SECURED DEVICES

CROSS-REFERENCE TO RELATED APPLICATIONS

The present application is a United States National Stage Application pursuant to 35 U.S.C. § 371 of International Patent Application No. PCT/US2022/070859, filed Feb. 28, 2022, and entitled, "Systems and Methods for Incident Reporting from Secured Devices," the disclosure of which is hereby incorporated by reference in its entirety.

FIELD OF THE DISCLOSURE

Aspects and implementations of the present disclosure are generally directed to secure communication technology, and more specifically, systems and methods for incident reporting from secured devices with access-controlled data.

BACKGROUND

Conventional management of numerous secured devices in a certain geographical unit area involves regular monitoring of operations by secured devices, technical support for secured device users requesting help with using secured devices, and incident reporting and troubleshooting for impairments of secured devices. Secured devices are, however, often not equipped with remote monitoring functionalities and unable to provide information on incidents enough to diagnose and troubleshoot causes of such incidents. Even if secured devices are initially provided with functionalities for remote monitoring and incident reporting, secured devices can still be disconnected from service provider servers due to a loss of connectivity on secure payment devices, interferences in the communication environment as being blocked by local firewall or isolated in a virtual private network (VPN), or failed to gain access to service provider servers due to a lost or expired credentials. In the context of secured payment devices used in the Payment Card Industry (PCI), the secured devices must comply with the Data Security Standards (PCI DSS) to prevent credit card fraud. Because secured payment devices are often used over a large geographical area in great numbers, maintaining secured payment devices with incident reports on site is impractical. Further, because incident reports are regarded as sensitive information and accessing such incident reports from secured devices are regulated as an administrative operation of payment software that is limited to authorized personnel under the PCI DSS, it would be more challenging to obtain incident reports remotely from secured device with impaired connectivity to service provider servers. Accordingly, it would be desirable to have a solution to remotely obtain incident reports from disconnected secured devices while maintaining the incident reports protected.

SUMMARY OF THE DISCLOSURE

The present disclosure is directed to methods and systems for incident reporting from secured devices.

In one example, a method is provided, the method including: detecting, by one or more processors on a secured IoT device for a registered user, an incident on the secured IoT device that disrupts normal operations by the secured IoT device, where the secured IoT device during the normal operations is operatively coupled to a digital communication network; collecting, by the one or more processors, a preconfigured set of incident data relevant to the incident from the secured IoT device; encrypting, by the one or more processors, the incident data resulting from the collecting based on a preselected cryptosystem; generating, by the one or more processors, an encoded incident report by use of a Uniform Resource Locator (URL) to a technical support server and the incident data from the encrypting as encoded into characters, where the technical support server is operatively coupled to the digital communication network; and producing, by the one or more processors, the encoded incident report in a QR code and a request to scan the QR code via one or more output interface of the secured IoT device to thereby have the encoded incident report sent to the technical support server by a reporter device come in contact with the QR code based on that the reporter device is operatively coupled to the digital communication network.

In an aspect of the method, the incident data includes an identification of the secured IoT device, a tamper indicator of the secured IoT device, system registers in the secured IoT device, a backtrace of the secured IoT device, software content and attributes in a memory map of the secured IoT device, a memory usage and a storage usage, and respectively corresponding values thereof, and wherein the incident data is sensitive information that is protected according to data security standards applicable for the secured IoT device.

In an aspect, the method also including: based on ascertaining that the secured IoT device has a Near Field Communication (NFC) data transmission capacity to send out the encoded incident report, producing, prior to the step of producing the encoded incident report in the QR code and the request to scan the QR code, a request to bring the reporter device within a range of the NFC data transmission; and based on ascertaining that the encoded incident report had been sent to the technical support server by the NFC data transmission to the reporter device, withholding the step of producing the encoded incident report in the QR code and the request to scan the QR code.

In an aspect, the method also including: based on ascertaining that the secured IoT device has a Near Field Communication (NFC) data transmission capacity to send out the encoded incident report, producing, prior to the step of producing the encoded incident report in the QR code and the request to scan the QR code, a request to bring the reporter device within a range of the NFC data transmission; and based on ascertaining that the encoded incident report had not been sent to the technical support server by the NFC data transmission to the reporter device, proceeding with the step of producing the encoded incident report in the QR code and the request to scan the QR code.

In an aspect, the method also including: applying an RSA optimal asymmetric encryption padding (OAEP) to the incident data with an RSA public key that had been previously shared with the secured IoT device.

In an aspect, the method also including: applying a preselected compression program to the incident data from collecting to thereby minimize a size of the incident data; and applying an RSA optimal asymmetric encryption padding (OAEP) to the incident data with an RSA public key that had been previously shared with the secured IoT device.

In an aspect, the method also including: encoding the incident data resulting from the encrypting into the characters by use of the Base64 encoding scheme; and adding the incident data from the encoding as a payload to the URL to the technical support server.

In another example, a computer program product is provided, the computer program product including: a computer readable storage medium readable by one or more processors and storing instructions for execution by the one or more processors for performing a method including: detecting an incident on a secured IoT device that disrupts normal operations by the secured IoT device, where the secured IoT device during the normal operations is operatively coupled to a digital communication network; collecting a preconfigured set of incident data relevant to the incident from the secured IoT device; encrypting the incident data resulting from the collecting based on a preselected cryptosystem; generating an encoded incident report by use of a Uniform Resource Locator (URL) to a technical support server and the incident data from the encrypting as encoded into characters, wherein the technical support server is operatively coupled to the digital communication network; and producing the encoded incident report in a QR code and a request to scan the QR code via one or more output interface of the secured IoT device to thereby have the encoded incident report sent to the technical support server by a reporter device come in contact with the QR code based on that the reporter device is operatively coupled to the digital communication network.

In an aspect of the computer program product, the incident data includes an identification of the secured IoT device, a tamper indicator of the secured IoT device, system registers in the secured IoT device, a backtrace of the secured IoT device, software content and attributes in a memory map of the secured IoT device, a memory usage and a storage usage, and respectively corresponding values thereof, and wherein the incident data is sensitive information that is protected according to data security standards applicable for the secured IoT device.

In an aspect, the computer program product also including: based on ascertaining that the secured IoT device has a Near Field Communication (NFC) data transmission capacity to send out the encoded incident report, producing, prior to the step of producing the encoded incident report in the QR code and the request to scan the QR code, a request to bring the reporter device within a range of the NFC data transmission; and based on ascertaining that the encoded incident report had been sent to the technical support server by the NFC data transmission to the reporter device, withholding the step of producing the encoded incident report in the QR code and the request to scan the QR code.

In an aspect, the computer program product also including: based on ascertaining that the secured IoT device has a Near Field Communication (NFC) data transmission capacity to send out the encoded incident report, producing, prior to the step of producing the encoded incident report in the QR code and the request to scan the QR code, a request to bring the reporter device within a range of the NFC data transmission; and based on ascertaining that the encoded incident report had not been sent to the technical support server by the NFC data transmission to the reporter device, proceeding with the step of producing the encoded incident report in the QR code and the request to scan the QR code.

In an aspect, the computer program product also including: applying an RSA optimal asymmetric encryption padding (OAEP) to the incident data with an RSA public key that had been previously shared with the secured IoT device.

In an aspect, the computer program product also including: applying a preselected compression program to the incident data from collecting to thereby minimize a size of the incident data; and applying an RSA optimal asymmetric encryption padding (OAEP) to the incident data with an RSA public key that had been previously shared with the secured IoT device.

In an aspect, the computer program product also including: encoding the incident data resulting from the encrypting into the characters by use of the Base64 encoding scheme; and adding the incident data from the encoding as a payload to the URL to the technical support server.

In still another example, a system is provided, the system including: a memory; one or more processors in communication with the memory; and program instructions executable by the one or more processors via the memory to perform a method including: detecting an incident on a secured IoT device that disrupts normal operations by the secured IoT device, where the secured IoT device during the normal operations is operatively coupled to a digital communication network; collecting a preconfigured set of incident data relevant to the incident from the secured IoT device; encrypting the incident data resulting from the collecting based on a preselected cryptosystem; generating an encoded incident report a technical support server as a service ticket to a service management tool, and the incident data from the encrypting as encoded into characters, where the technical support server and the service management tool are operatively coupled to the digital communication network; and automatically submitting the encoded incident report as the service ticket to the service management tool via the digital communication network.

In an aspect, the system also including: applying an RSA optimal asymmetric encryption padding (OAEP) to the incident data with an RSA public key that had been previously shared with the secured IoT device.

In an aspect, the system also including: applying a preselected compression program to the incident data from collecting to thereby minimize a size of the incident data; and applying an RSA optimal asymmetric encryption padding (OAEP) to the incident data with an RSA public key that had been previously shared with the secured IoT device.

In an aspect, the system also including: encoding the incident data resulting from the encrypting into the characters by use of the Base64 encoding scheme; and adding the incident data from the encoding as a payload to the URL to the technical support server.

These and other aspects of the various embodiments will be apparent from and elucidated with reference to the embodiment(s) described hereinafter.

BRIEF DESCRIPTION OF THE DRAWINGS

In the drawings, like reference characters and numerals generally refer to the same parts throughout the different views. Also, the drawings are not necessarily to scale, emphasis instead generally being placed upon illustrating the principles of the various embodiments.

FIG. 5 is an exemplary listing in the incident report of FIG. 1 as shown on the technical support server for the authorized technician according to the present disclosure.

DETAILED DESCRIPTION OF EMBODIMENTS

The present disclosure is directed to methods and systems for communicating incident reports from secured devices with access-controlled data, where data communication connectivity of secured devices has been impaired to the extent that secured device cannot directly communicate with any other authorized pieces of machinery or authorized personnel. The secured devices encapsulate incident reports in a way that the only on authorized pieces of machinery by authorized personnel decode the incident reports for troubleshooting of any issue from the incident reports. The secured devices will recruit any device with data communication connectivity near the secured device to relay the encapsulated incident reports to an authorized destination combined with the encoded incident reports, without revealing any details of the incident reports. The following description should be read in view of FIGS. 1-6.

Figure 1:
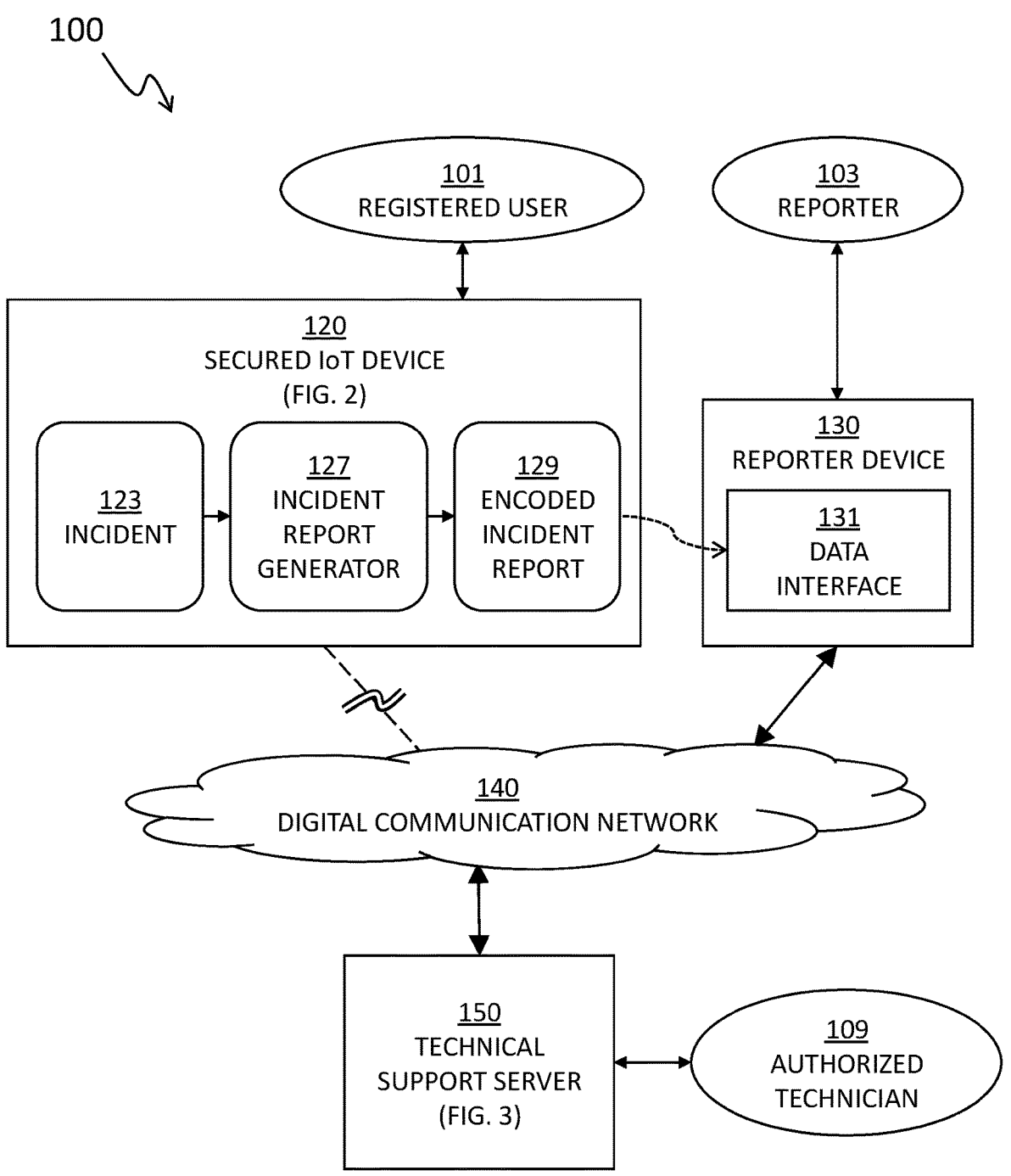
FIG. 1 is a diagram for functional components of a secure communication scheme according to the present disclosure.

FIG. 1 is a diagram for functional components of a secure communication scheme 100 according to the present disclosure.

The secure communication scheme 100 includes a secured Internet of Things (IoT) device 120, a reporter device 130, and a technical support server 150. A digital communication network 140 operatively couples the reporter device 130 and the technical support server 150. The secured IoT device 120 is also operatively coupled to the digital communication network 140 but the connectivity of the secured IoT device 120 is impaired at the moment, and accordingly, the secured IoT device 120 is not connected to either the digital communication network 140 or the technical support server 150.

The secured IoT device 120 is deployed for a registered user 101 who is authorized to use the secured IoT device 120 with effective credentials for a type of service that requires the secured IoT device 120 to comply with data security standards corresponding to the type of service. For example, the registered user 101 is a merchant at a retail location and the secured IoT device 120 is a payment device 10 of FIG. 6 to process payments for the merchant, which is subject to the Payment Card Industry Data Security Standard (PCI DSS) to prevent credit card fraud. The PCI DSS is an information security standard for organizations that handle branded credit cards from the major card schemes. The PCI DSS is mandated by the card brands and the compliance thereto should be verified periodically.

The secured IoT device 120 includes an incident report generator 127 that is implemented as a software or hardware module in the secured IoT device 120. Upon detecting an incident 123 on the secured IoT device 120 that interferes with normal operations of the secured IoT device 120, the incident report generator 127 produces an encoded incident report 129 by collecting and encrypting information on the incident 123 and by encoding encrypted information on the incident 123 into a Uniform Resource Locator (URL) to the technical support server 150. In another example, the incident report generator 127 generates an encoded service ticket using the information on the incident 123. The encoded service ticket may be associated with a service management tool such as Jira Service Management. (Jira Service Management is a registered trademark of Atlassian in the United States) The normal operations of the secured IoT device 120 indicate operations rendering services for which the secured IoT device 120 has been produced and deployed for the registered user 101. For example, if the secured IoT device 120 is an example of the payment device 10 of FIG. 6 as noted above, then normal operations of the secured IoT device 120 include, but are not limited to, communicating with a payment service provider that issued the secured IoT device 120 in performing payment transactions for the registered user 101 who is a merchant.

The secured IoT device 120 presents the encoded incident report 129 to the reporter device 130 for transmission to the technical support server 150. The secured IoT device 120 presents the encoded incident report 129 to the reporter device 130 in a format easily accessible for most mobile devices, including but not limited to, a display of a message to scan and the encoded incident report 129 in a Quick Response (QR) code format on a screen of the secured IoT device 120, a printout of on paper of a message to scan and the encoded incident report 129 in QR code to a printer available from the secured IoT device 120, an instruction for a Near Field Communication (NFC) data transmission, etc. A QR code is a machine-readable optical label widely used to deliver any type of information to a certain length specific to a size of the label, often used for a web link, tracking packages, user verification information, that can be easily input by scanning with a QR code reader without input error. Details on operations of the secured IoT device 120 in the incident report generator 127 are presented in FIG. 2 and corresponding description. The loss of connectivity on the secured IoT device 120 may or may not be related to the incident 123 on the secured IoT device 120.

The reporter device 130 is connected to the digital communication network 140) and located near the secured IoT device 120. A reporter 103 can be any body with the reporter device 130, including the registered user 101. The reporter 103 can be the registered user 101, a technician, or even a pedestrian walked into a kiosk operating the secured IoT device 120 for payment services and the reporter device 130 is a mobile phone of the reporter 103. The reporter device 103 includes a data interface 131 that can read the encoded incident report 129 the reporter device 130 to forward the encoded incident report 129 to the technical support server 150. Examples of the reporter device 130 include, but are not limited to, a mobile phone, a tablet, and other similar digital devices that have access to the digital communication network 140. Examples of the data interface 131 on the reporter device 130 include, but are not limited to, a digital camera and a QR code reader, and an NFC data interface.

The technical support server 150 regularly communicates with the secured IoT device 120 via the digital communication network 140 for monitoring and maintenance in the secure communication scheme 100. The technical support server 150 is located across from the secured IoT device 120 as shown in FIG. 1. In the secure communication scheme 100, however, the secured IoT device 120 has lost the connectivity to the digital communication network 140, and accordingly, cannot communicate directly with the technical support server 150. The technical support server 150 obtains the encoded incident report 129 from the reporter device 130 as the reporter device 130 relays the encoded incident report 129 presented for the reporter device 130. The technical support server 150 subsequently processed the encoded incident report 129. Details on operations of the technical support server 150 are presented in FIG. 3 and corresponding description.

In certain embodiments of the present disclosure, where the secured IoT device 120 is coupled to the technical support server 150 via the digital communication network 140, the secured IoT device 120 can periodically collect and encrypt system logs and incident reports of the secured IoT device 120 and produce a URL encoded device report or a service ticket and send to the technical support server 150 for regular maintenance. By use of enhancing the secured IoT device 120 with the incident report generator 127 producing the encoded incident report 129 including the encrypted system logs and incident reports, the secured IoT device 120 can securely and remotely report sensitive information to protect to the technical support server 150. Accordingly, there would be no need to physically ship the secured IoT device 120 to the authorized technician 109 or to have the authorized technician 109 travel to a site of the secured IoT device 120 to retrieve system logs and incident reports, as in conventional maintenance of secured IoT devices. The system log encoded into an encrypted payload of a URL can facilitate most of diagnostics and troubleshooting to be performed remotely, which will significantly improve time and cost efficiency in maintaining the secured IoT device 120 on a service provider offering the secured IoT device 120.

In certain embodiments where the incident report generator 127 generates a service ticket associated with a service management tool as noted above, the encoded incident report 129 would be automatically reported to the service management tool with the service ticket and can be transferred to the technical support server 150 via the service management tool without use of the reporter device 130.

Figure 2:
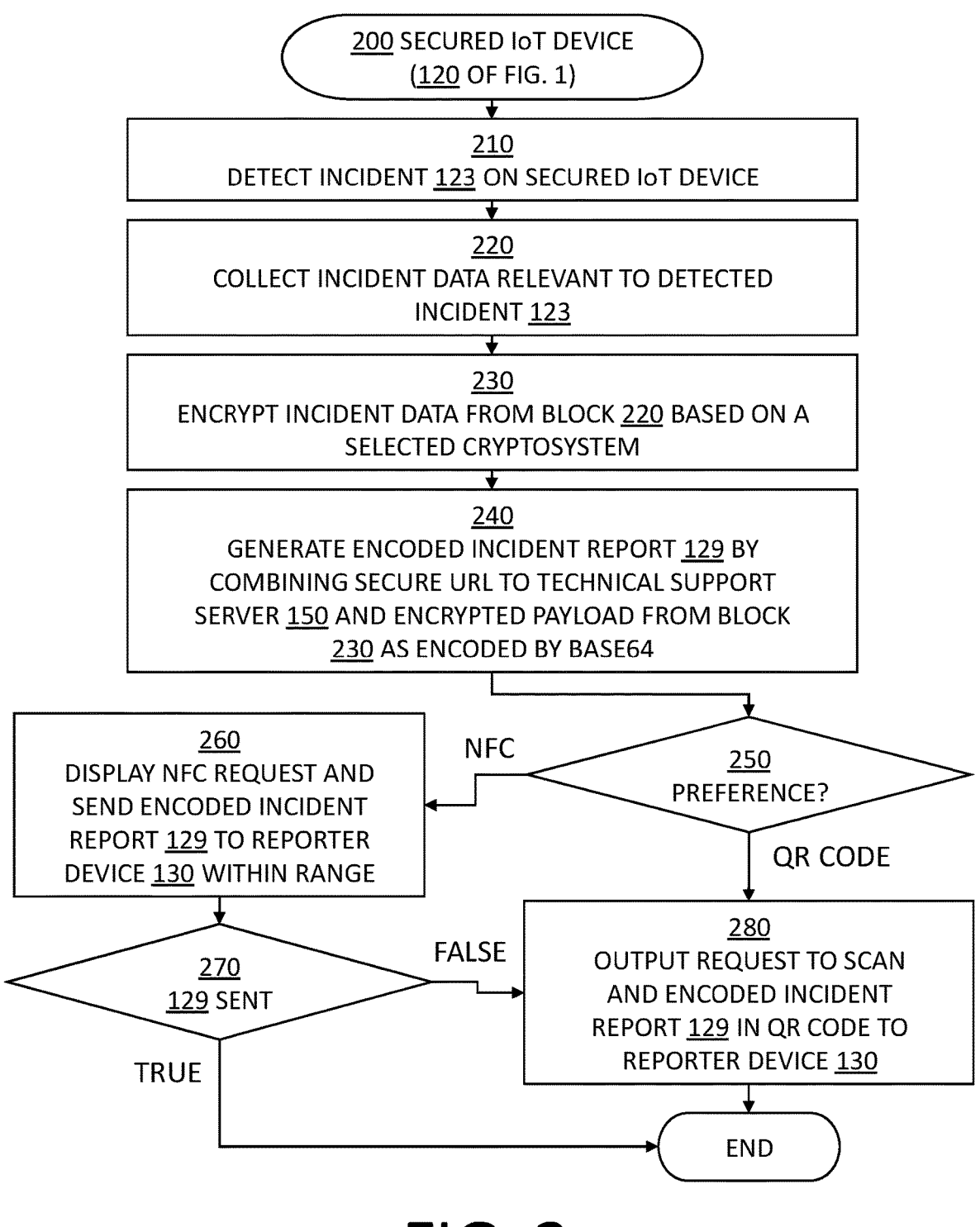
FIG. 2 is a flowchart illustrating exemplary steps of the secure IoT device of FIG. 1 according to the present disclosure.
Figure 4:
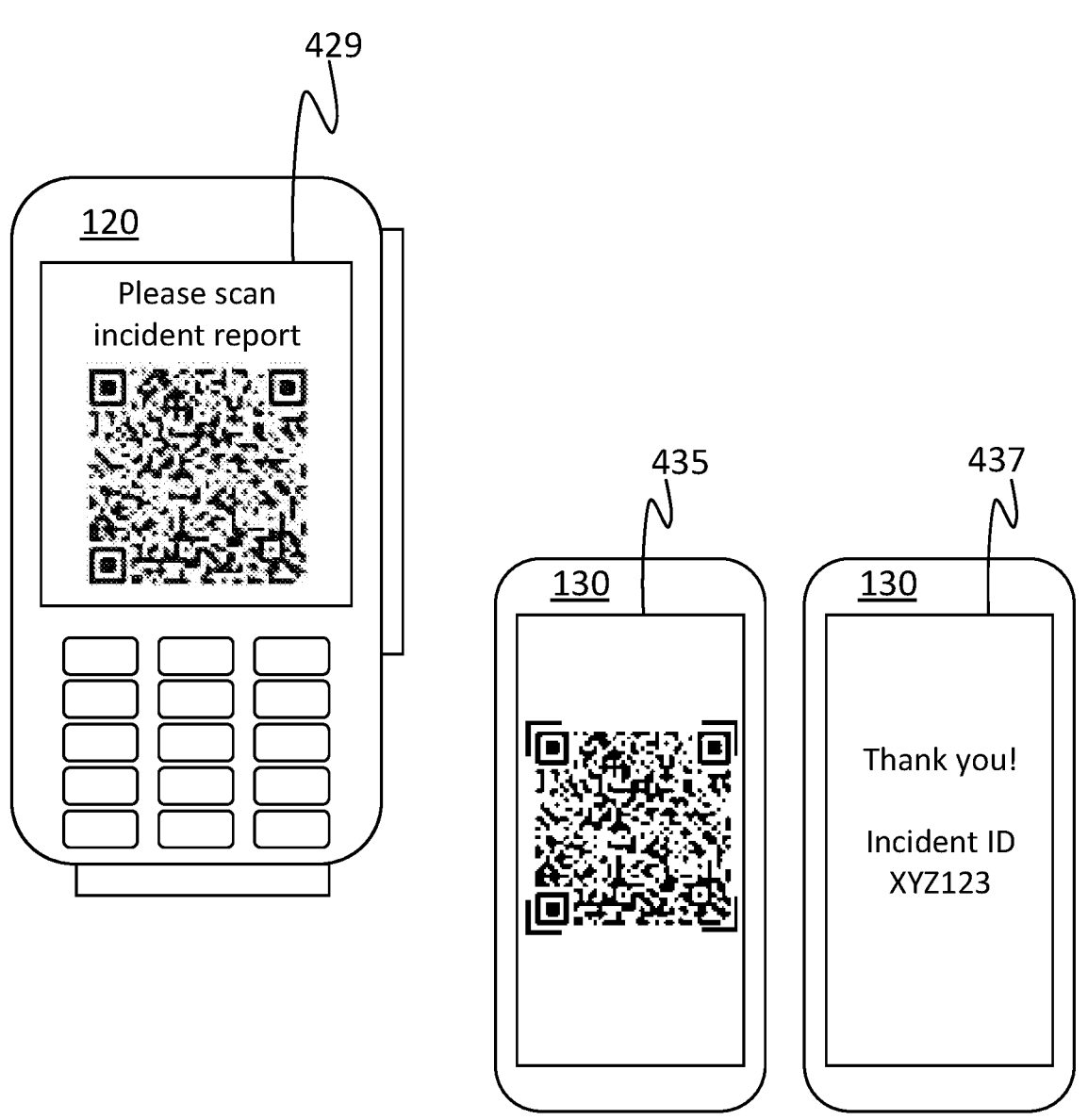
FIG. 4 depicts exemplary displays on the secure IoT device and on the reporter device of FIG. 1 regarding block 280 of the secured IoT device and block 320 of the technical support server according to the present disclosure.

FIG. 2 is a flowchart illustrating exemplary steps of the secure IoT device 120 of FIG. 1 according to the present disclosure. FIG. 4 depicts an exemplary display on the secure IoT device 120 regarding block 280 of the secured IoT device 120 and an exemplary display on the reporter device 130 regarding block 280 of the secured IoT device 120 according to the present disclosure.

In block 210, the secured IoT device 120 detects the incident 123 on the secured IoT device 120. The incident 123 indicates any event or occurrence with the secured IoT device 120 other than normal operations, from a complete system crash to a minor malfunction. The operating system of the secured IoT device 120 handles detection of the incident 123 and invokes the incident report generator 127. Then, the secured IoT device 120 proceeds with block 220.

In block 220, the incident report generator 127 of the secured IoT device 120 collects data relevant to the incident 123 from hardware and software of the secured IoT device 120. The incident report generator 127 collects information including, but not limited to, respective values in identification information for the secured IoT device 120 including a model number and a serial number, a tamper indicator, system registers, a backtrace, software content in a memory map, a memory usage and a storage usage, etc. The term "backtrace" indicates a list of function calls that are currently active in a thread of execution in the field of computing and programming. Examples of the information on the incident 123 are presented in FIG. 5 and corresponding description. As noted above, the incident data collected in block 220 is sensitive information that can be accessed only by the authorized technician 109. Then, the secured IoT device 120 proceeds with block 230.

In block 230, the incident report generator 127 of the secured IoT device 120 encrypts the incident data collected from block 220. The incident report generator 127 can optionally compress or otherwise contract the incident data to fit a preconfigured length of the incident report or to shorten the incident data as much as possible if necessary. Then, the secured IoT device 120 proceeds with block 240.

In certain embodiments of the present disclosure, the incident report generator 127 optionally utilizes a currently available compression algorithm like DEFLATE (zlib) to minimize the size of the incident data.

For encrypting the incident data, the incident report generator 127 is configured for an encryption method based on the key management scheme for the secured IoT device 120 and cryptographic operations supported on the secured IoT device 120. The encryption method can be selected as one of symmetric cryptosystems or one of asymmetric cryptosystems.

The symmetric cryptosystems are based on a same key to encrypt and decrypt the incident data. A secret key is generated from a password entered by the registered user 101 and used to encrypt incident data as a payload in the URL to the technical support server 150. Alternatively, a shared secret key had been previously generated and embedded or loaded in a system storage of the secured IoT device 120 and used to encrypt incident data as a payload in the URL to the technical support server 150. For decryption of the incident data that had been encrypted with symmetric cryptosystems, the technical support server 150 utilizes a hardware security module (HSM) which holds the same key as the secret key or the shared secret key as used in encryption.

The asymmetric cryptosystems are based on a public key embedded on the secured IoT device 120. The incident report generator 127 encrypts incident data as a payload in the URL to the technical support server 150 by use of RSA (Rivest-Shamir-Adleman) Optimal Asymmetric Encryption Padding (OAEP) method based on an RSA public key that had been previously shared by the technical support service 150 or a manufacturer for the secured IoT device 120. The RSA OAEP is preferred to the symmetric cryptosystems described above. The RSA public key is embedded or loaded in the system storage of the secured IoT device 120 to encrypt the payload that corresponds to the size of the RSA public key. For example, a 3072-bit RSA key can be used to encrypt 3072 bits or 319 bytes of effective maximum message payload, a 4096-bit RSA key to encrypt 4096 bits or 447 bytes of effective maximum message payload.

Another cryptosystem of elliptic-curve cryptography (ECC) also uses a public key for symmetric encryption of the payload based on the algebraic structure of elliptic curves over finite fields. Any other cryptosystem that can encrypt the incident data at a required level of strength within a limit on the length of the encrypted incident data for transmission can be utilized.

In block 240, the secured IoT device 120 generates the encoded incident report 129 in a format of a URL to the technical support server 150 with the encrypted incident data from block 230 as a payload. Then, the secured IoT device 120 proceeds with block 250.

In certain embodiments, the secured IoT device 120 generates the encoded incident report 129 as a service ticket to a service management tool, as noted above. In the same embodiments, the secured IoT device 120 is operatively coupled to the service management tool and the service ticket corresponding to the encoded incident report 129 would be automatically sent to the service management tool, and ultimately the technical support server 150. In the same embodiment, the secured IoT device 120 concludes reporting the incident 123 upon sending the service ticket to the service management tool.

The incident report generator 127 of the secured IoT device 120 encodes the encrypted incident data from block 230 into characters allowed in a URL by use of known methods such as Base64 encoding scheme. The incident report generator 127 of the secured IoT device 120 subsequently combines the encrypted incident data payload as being Base64 encoded with the URL to the technical support server 150. The URL including an address and payload can be 2048 characters or longer in length, which is sufficient in capacity to convey encoded incident report 129. For example, the encoded incident report 129 resulting from block 240) would be represented in form such as "http://supporturl.com/url?var=<Base64_encrypted_crash_log>", where the URL for the technical support server 150 is "supporturl.com/url" and the encrypted incident data as encoded in the Base64 scheme would be placed as a payload in place of "<Base64_encrypted_crash_log>."

In block 250, the secured IoT device 120 determines how the secured IoT device 120 is configured to communicate with the reporter device 130 to transmit the encoded incident report 129. If the secured IoT device 120 determines that the secured IoT device 120 is configured to use the Near Field Communication (NFC) data transmission to communicate the encoded incident report 120 to the reporter device 130, then the secured IoT device 120 proceeds with block 260. If the secured IoT device 120 is configured to communicate the encoded incident report 129 with the reporter device 130 via a QR code, then the secured IoT device 120 proceeds with block 280.

The NFC data transmission functionality necessary in block 250 is distinctive from commonly used NFC chip readers on the secured IoT device 120 that reads NFC chips in payment cards for contactless payment without requiring the payment cards to be inserted into a smart chip reader or to be swiped by a magnetic strip reader.

In block 260, the secured IoT device 120 displays an NFC request for the reporter device 130, which asks the reporter 103 to activate the NFC function on the reporter device and to bring the reporter device 130 within an NFC transmission range, that is, 1 inch or 2.54 centimeters, from an NFC tag on the secured IoT device 120 for transmission. The secured IoT device 120 sends the encoded incident report 129 to the reporter device 130 upon detecting the reporter device 130 within the NFC transmission range. Then, the secured IoT device 120 proceeds with block 270.

In block 270), the secured IoT device 120 determines if the secured IoT device 120 had sent the encoded incident report 129 via NFC transmission from block 260. If the secured IoT device 120 determines that the encoded incident report 129 had been sent, then the secured IoT device 120 terminates processing for the incident 123. If the secured IoT device 120 determines that the encoded incident report 129 had not been sent, then the secured IoT device 120 proceeds with block 280.

In block 280, the secured IoT device 120 outputs the encoded incident report 129 in a QR code and a request for the reporter 103 to scan the QR code with the reporter device 130. As noted above, the secured IoT device 120 can print out the encoded incident report 129 in the QR code and the request to a printer available to the secured IoT device 120 or put up the encoded incident report 129 in the QR code and the request on a display screen of the secured IoT device 120. Then, the secured IoT device 120 terminates processing for the incident 123.

The QR code can encode a certain amount of data per various "versions" of QR codes in different sizes, from Version 1 having 21×21 dots for a few characters to Version 40 having 177×177 dots for 2,953 8-bit characters. The secure IoT device 120 has a large enough display or coupled to a printer printing on at least the similar sizes to the display screen of the secured IoT device 120 to include 2048 characters as in the URL with encrypted payload.

A snapshot 429 of FIG. 4 depicts a display screen of the secured IoT device 120 displaying an exemplary request "Please scan incident report" along with the QR code representing the encoded incident report 129 as resulting from block 280. The snapshot 429 can be printed on a paper as noted above.

A snapshot 435 of FIG. 4 depicts a touchscreen of the reporter device 130 running a QR code reader application scanning the QR code from a display screen of the secured IoT device 120 or a printed paper with a camera on the reporter device 130.

Figure 3:
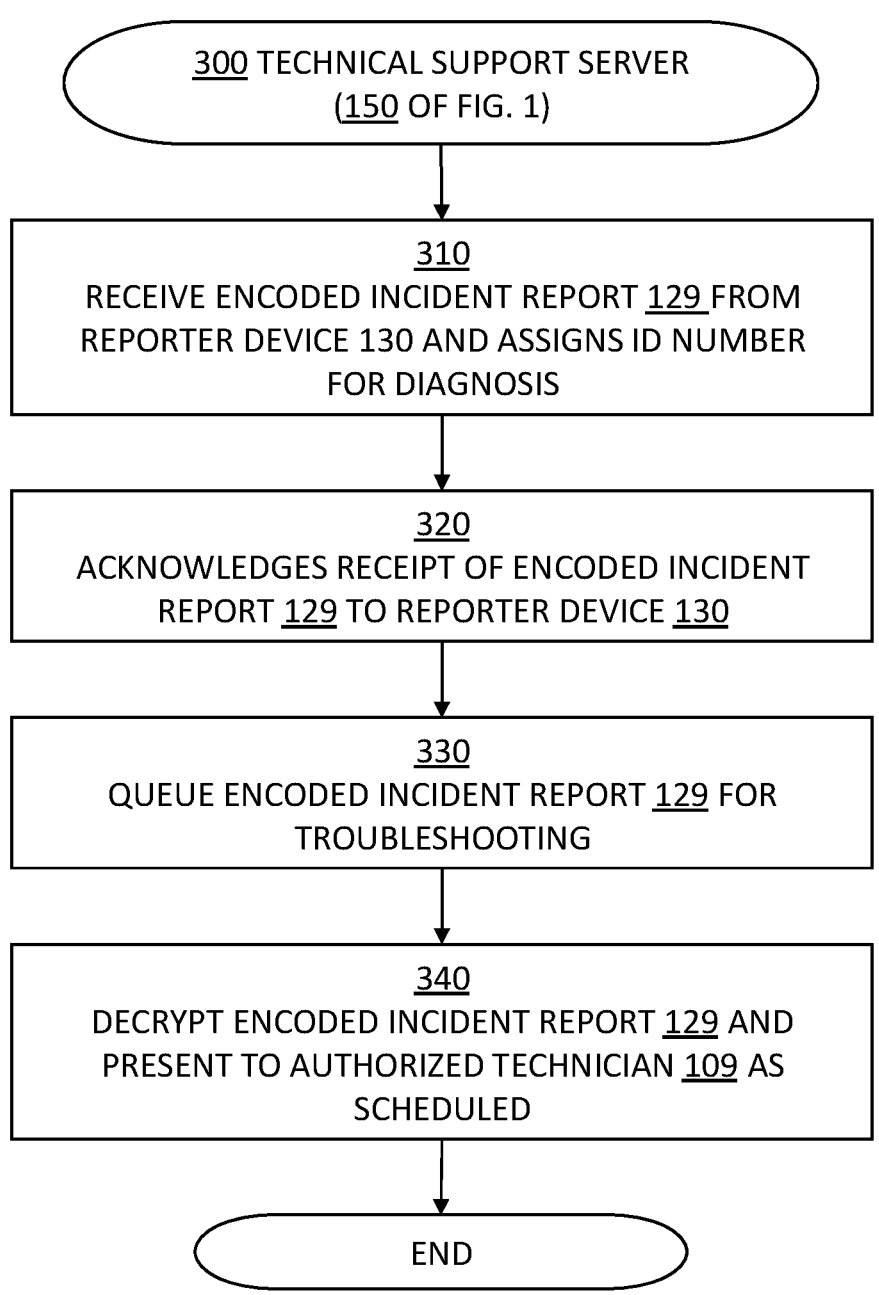
FIG. 3 is a flowchart illustrating exemplary steps of the technical support server of FIG. 1 according to the present disclosure.

FIG. 3 is a flowchart illustrating exemplary steps of the technical support server 150 of FIG. 1 according to the present disclosure. FIG. 4 depicts an exemplary display on the reporter device 130 regarding block 320 of the technical support server 150 according to the present disclosure.

In block 310, the technical support server 150 receives the encoded incident report 129 of the secured IoT device 120 as relayed from the reporter device 130 and assigns an ID number for the encoded incident report 129 to follow up with issues of the encoded incident report 129. Then, the technical support server 150 proceeds with block 320.

In certain embodiments of the present disclosure where the QR code is used, as soon as the reporter device 130 scans the QR code produced by the secured IoT device 120 in block 280 of FIG. 2, as shown in snapshot 435 of FIG. 4, the technical support server 150 receives the encoded incident report 129 in block 310.

In block 320, the technical support server 150 acknowledges the receipt of the encoded incident report 129 by sending a reception confirmation to the reporter device 130. The technical support server 150 can collect basic information on the reporter device 130 sent along with the encoded incident report 129 from the HTTP session opened by the QR code such as geolocation, local date and time, and main language of the reporter device 130 for system management statistics and future maintenance purposes. Then, the technical support server 150 proceeds with block 330.

Further in block 320, the technical support server 150 may send out a message asking if the reporter 103 of the reporter device 130 would be interested in further update with a resolution of the encoded incident report 129 and to prompt for a credential of the registered user 101. Once the technical support server 150 confirms that the reporter 103 is the registered user 101, then the technical support server 150 can send out the ID number for the encoded incident report 129 as assigned in block 310 such that the registered user 101 can monitor the status updates with the encoded incident report 129.

A snapshot 437 of FIG. 4 depicts a display on the reporter device 130 as receiving the reception confirmation acknowledging the encoded incident report 129 with the incident ID number assigned by the technical support server 150. As noted above, the technical support server 150 sends out the ID number for the encoded incident report 129 incident ID only when the reporter 103 can provide the credentials of the registered user 101. The technical support server 150 can simply thank the reporter 103 without giving out the incident ID if the reporter 103 failed or did not attempt to prove to be the registered user 101, and subsequently contact the registered user 101 based on contact information of an account for the registered user 101 linked to the secured IoT device 120.

In block 330, the technical support server 150 queues the encoded incident report 129 for troubleshooting according to a priority assigned to the encoded incident report 129. Then, the technical support server 150 proceeds with block 340.

In block 340, the technical support server 150 decrypts the encoded incident report 129 and presents to authorized technician 109 as scheduled for diagnosis and troubleshooting of issues reported in the encoded incident report 129. Then, the technical support server 150 terminates processing the encoded incident report 129.

In block 340, for decryption of the incident data that had been encrypted with the secret key or the shared secret key based on a symmetric cryptosystem in block 230 of the secured IoT device 120, the technical support server 150 utilizes a hardware security module (HSM) which holds the same key as the secret key or the shared secret key as used in encryption. In embodiments of the present disclosure where the incident data that had been encrypted with the public key in an asymmetric cryptosystem in block 230 of the secured IoT device 120, the technical support server 150 utilizes both a decryption key that is distinctive from the public key for encryption and two (2) large prime numbers used to generate the public key for encryption by the secured IoT device 120. Both the decryption key and the prime numbers were kept private at the technical support server 150 and utilized to decrypt the encoded incident report 129 in block 340).

In certain embodiments of the present disclosure, block 340 for decrypting the encoded incident report 129 can be performed any time after receiving the encoded incident report 129 and prior to when the authorized technician 109 is ready to diagnose the incident 123.

FIG. 5 is an exemplary listing 500 of the incident report 129 of FIG. 1 as shown on the technical support server 150 for the authorized technician 109 according to the present disclosure.

The exemplary listing 500 of the incident report 129 results from decoding the URL payload portion of the encoded incident report 129 by Base64 scheme and then decrypting the decoded payload based on the decryption method corresponding to the cryptosystem used in the secured IoT device 120 in block 230 to encrypt the incident data.

The incident data encapsulated in the encoded incident report 129 are shown in the exemplary listing 500. The labels in the exemplary listing 500 are shown for readability only when the authorized technician 109 accesses the incident data.

Line 501 of the exemplary listing 500 represents a serial number value "999-145-123" that uniquely identifies the secured IoT device 120. Line 502 represents a flag value "no" for the tamper indicator of the secured IoT device 120 representing that the secured IoT device 120 had not been tampered. Line 503 represents an identification value "mymerchant" for the registered user 101 for the secured IoT device 120. Line 504 "flashfs 25 MB rootfs: 12 MB" represents how much of a flash memory of the secured IoT device 120 is available respective to two (2) file systems, which is 25 megabytes for flashfs filesystem and 12 megabytes for rootfs filesystem at the time of collecting the incident data. Line 505 "65 MB" represents 65 megabytes of a random access memory (RAM) is available on the secured IoT device 120 at the time of collecting the incident data. Line 506 "Process ID=2060" represents that a process having ID value "2060" had caused the incident 123. Line 507 represents that the incident 123 is a "segmentation fault" type.

Lines 508 through 513 represent a backtrace indicating a list of function calls that had been active in a thread at the time of the incident 123 or collecting the incident data, with a path to a function "./backtracehandler_example" for line 509, a description or ID of the function "signal_handler+ (x6b" for line 509 and a program counter value "0x8b78" for line 509. Lines 514 through 524 represent an excerpt from a memory map at the time of the incident 123 or collecting the incident data. Memory map shows respective address spaces for the functions listed in the backtrace above with a hexadecimal range of memory block "00008000-0000a000" in line 515, access attributes for the memory block "r-xp" in line 515, etc., as well as certain system address spaces such as heap in line 518 or stack in line 523. Lines 525 through 532 represent all registers in the secured IoT device 120 and respective values set in the registers at the time of the incident 123 or collecting the incident data.

The exemplary listing 500 demonstrates that the authorized technician 109 working on the technical support server 150 would be well informed on the status of the secured IoT device 120 regarding the incident 123 to diagnose and to resolve issues caused the incident 123 efficiently without waiting for the secured IoT device 120 to be shipped to a site of the technical support server 150 which access the incident data or traveling to a site of the secured IoT device 120.

Figure 6:
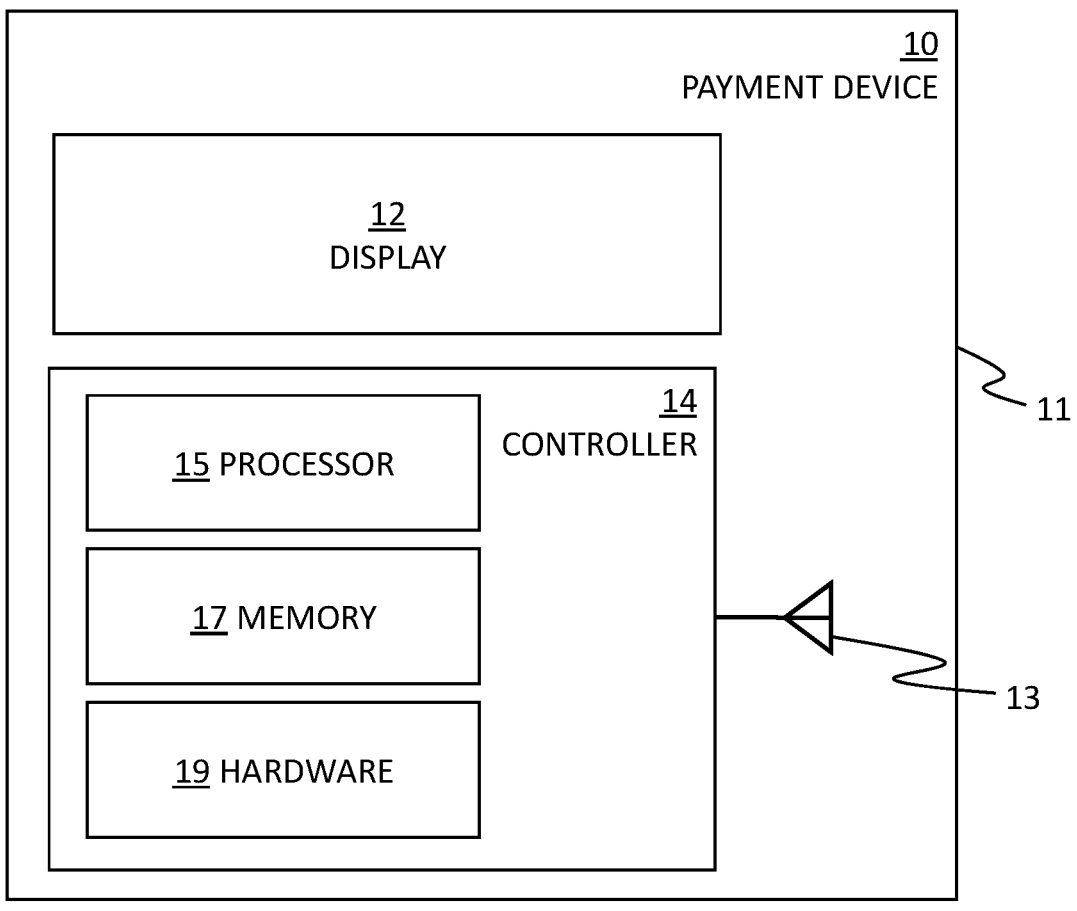
FIG. 6 depicts an exemplary schematic diagram of a payment device, focusing primarily on processing and components useful for completing the functions and methods described in the present disclosure.

FIG. 6 depicts an exemplary schematic diagram of a payment device 10, focusing primarily on processing and components useful for completing the functions and methods in place of the merchant device 110 described in this disclosure. As shown, the payment device 10, in this example, includes a housing 11, a display 12, an antenna 13, and a controller 14. To focus more on the pertinent features of payment device 10, not shown in FIG. 7 are components for receiving payments via magnetic stripe, a chip, or Near Field Communication (NFC), components for connection to a network, such as a payment processing network, components for receiving power (e.g., a power supply), etc., which can be present in various examples of the payment device 10.

The controller 14 can include one or more processors 15, and any associated hardware 17, configured to execute at least one step (e.g., the steps described in connection with the method described herein) stored in a non-transitory storage medium, such as a memory 17, to perform the various functional components described in this disclosure. For example, the controller 14 can be a microprocessor or microcontroller executing steps stored in the memory 17 (either as firmware or software). The antenna 13, as described above, can be any suitable antenna for determining a range to a payment transceiver. Although the antenna 13 is shown disposed within the housing 11, it should be understood that in, alternative examples, the antenna 13 can be disposed on the housing 11, extending from the housing 11, or remote from the housing 11. Further, in various alternative examples, as described above, the controller 14 can receive signals from multiple antennas and/or transmit data encoded by the processors 15 in communication with one or more antennas. The display 12 can be employed to notify a user of information such as totals before a payment is approved, and status updates on the processing, such as approval or denial.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled. While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method comprising:
   detecting, by one or more processors on a secured IoT device for a registered user, an incident on the secured IoT device that disrupts normal operations by the secured IoT device, wherein the secured IoT device during the normal operations is operatively coupled to a digital communication network;
   collecting, by the one or more processors, a preconfigured set of incident data relevant to the incident from the secured IoT device;
   encrypting, by the one or more processors, the incident data resulting from the collecting based on a preselected cryptosystem;
   generating, by the one or more processors, an encoded incident report by use of a Uniform Resource Locator (URL) to a technical support server and the incident data from the encrypting as encoded into characters, wherein the characters of the URL contain encrypted incident data to be conveyed to the technical support server, wherein the technical support server is operatively coupled to the digital communication network; and
   producing, by the one or more processors, the encoded incident report in a QR code and a request to scan the QR code via one or more output interface of the secured IoT device to thereby have the encoded incident report sent to the technical support server by a reporter device come in contact with the QR code based on that the reporter device is operatively coupled to the digital communication network.

2. The computer implemented method of claim 1, wherein the incident data comprises an identification of the secured IoT device, a tamper indicator of the secured IoT device, system registers in the secured IoT device, a backtrace of the secured IoT device, software content and attributes in a memory map of the secured IoT device, a memory usage and a storage usage, and respectively corresponding values thereof, and wherein the incident data is sensitive information that is protected according to data security standards applicable for the secured IoT device.

3. The computer implemented method of claim 1, further comprising:
   based on ascertaining that the secured IoT device has a Near Field Communication (NFC) data transmission capacity to send out the encoded incident report, producing, prior to the step of producing the encoded incident report in the QR code and the request to scan the QR code, a request to bring the reporter device within a range of the NFC data transmission; and based on ascertaining that the encoded incident report had been sent to the technical support server by the NFC data transmission to the reporter device, withholding the step of producing the encoded incident report in the QR code and the request to scan the QR code.

4. The computer implemented method of claim 1, further comprising:

based on ascertaining that the secured IoT device has a Near Field Communication (NFC) data transmission capacity to send out the encoded incident report, producing, prior to the step of producing the encoded incident report in the QR code and the request to scan the QR code, a request to bring the reporter device within a range of the NFC data transmission; and based on ascertaining that the encoded incident report had not been sent to the technical support server by the NFC data transmission to the reporter device, proceeding with the step of producing the encoded incident report in the QR code and the request to scan the QR code.

5. The computer implemented method of claim 1, the encrypting comprising:

applying an RSA optimal asymmetric encryption padding (OAEP) to the incident data with an RSA public key that had been previously shared with the secured IoT device.

6. The computer implemented method of claim 1, the encrypting comprising:

applying a preselected compression program to the incident data from collecting to thereby minimize a size of the incident data; and applying an RSA optimal asymmetric encryption padding (OAEP) to the incident data with an RSA public key that had been previously shared with the secured IoT device.

7. The computer implemented method of claim 1, the generating comprising:

encoding the incident data resulting from the encrypting into the characters by use of the Base64 encoding scheme; and adding the incident data from the encoding as a payload to the URL to the technical support server.

8. A computer program product comprising: a computer readable storage medium readable by one or more processors and storing instructions for execution by the one or more processors for performing a method comprising:

detecting an incident on a secured IoT device that disrupts normal operations by the secured IoT device, wherein the secured IoT device during the normal operations is operatively coupled to a digital communication network;

collecting a preconfigured set of incident data relevant to the incident from the secured IoT device;

encrypting the incident data resulting from the collecting based on a preselected cryptosystem;

generating an encoded incident report by use of a Uniform Resource Locator (URL) to a technical support server and the incident data from the encrypting as encoded into characters, wherein the characters of the URL contain encrypted incident data to be conveyed to the technical support server, wherein the technical support server is operatively coupled to the digital communication network; and producing the encoded incident report in a QR code and a request to scan the QR code via one or more output interface of the secured IoT device to thereby have the encoded incident report sent to the technical support server by a reporter device come in contact with the QR code based on that the reporter device is operatively coupled to the digital communication network.

9. The computer program product of claim 8, wherein the incident data comprises an identification of the secured IoT device, a tamper indicator of the secured IoT device, system registers in the secured IoT device, a backtrace of the secured IoT device, software content and attributes in a memory map of the secured IoT device, a memory usage and a storage usage, and respectively corresponding values thereof, and wherein the incident data is sensitive information that is protected according to data security standards applicable for the secured IoT device.

10. The computer program product of claim 8, further comprising:

based on ascertaining that the secured IoT device has a Near Field Communication (NFC) data transmission capacity to send out the encoded incident report, producing, prior to the step of producing the encoded incident report in the QR code and the request to scan the QR code, a request to bring the reporter device within a range of the NFC data transmission; and based on ascertaining that the encoded incident report had been sent to the technical support server by the NFC data transmission to the reporter device, withholding the step of producing the encoded incident report in the QR code and the request to scan the QR code.

11. The computer program product of claim 8, further comprising:

based on ascertaining that the secured IoT device has a Near Field Communication (NFC) data transmission capacity to send out the encoded incident report, producing, prior to the step of producing the encoded incident report in the QR code and the request to scan the QR code, a request to bring the reporter device within a range of the NFC data transmission; and based on ascertaining that the encoded incident report had not been sent to the technical support server by the NFC data transmission to the reporter device, proceeding with the step of producing the encoded incident report in the QR code and the request to scan the QR code.

12. The computer program product of claim 8, the encrypting comprising:

applying an RSA optimal asymmetric encryption padding (OAEP) to the incident data with an RSA public key that had been previously shared with the secured IoT device.

13. The computer program product of claim 8, the encrypting comprising:

applying a preselected compression program to the incident data from collecting to thereby minimize a size of the incident data; and applying an RSA optimal asymmetric encryption padding (OAEP) to the incident data with an RSA public key that had been previously shared with the secured IoT device.

14. The computer program product of claim 8, the generating comprising:

encoding the incident data resulting from the encrypting into the characters by use of the Base64 encoding scheme; and adding the incident data from the encoding as a payload to the URL to the technical support server.

15. A system comprising:

a memory;

one or more processors in communication with the memory; and program instructions executable by the one or more processors via the memory to perform a method comprising:

detecting an incident on a secured IoT device that disrupts normal operations by the secured IoT device, wherein the secured IoT device during the normal operations is operatively coupled to a digital communication network;

collecting a preconfigured set of incident data relevant to the incident from the secured IoT device;

encrypting the incident data resulting from the collecting based on a preselected cryptosystem;

generating an encoded incident report to a technical support server as a service ticket to a service management tool, and the incident data from the encrypting as encoded into characters, wherein the characters of the service ticket contain encrypted incident data to be conveyed to the technical support server, wherein the technical support server and the service management tool are operatively coupled to the digital communication network; and automatically submitting the encoded incident report as the service ticket to the service management tool via the digital communication network.

16. The system of claim 15, the encrypting comprising:

applying an RSA optimal asymmetric encryption padding (OAEP) to the incident data with an RSA public key that had been previously shared with the secured IoT device.

17. The system of claim 15, the encrypting comprising:

applying a preselected compression program to the incident data from collecting to thereby minimize a size of the incident data; and applying an RSA optimal asymmetric encryption padding (OAEP) to the incident data with an RSA public key that had been previously shared with the secured IoT device.

18. The system of claim 15, the generating comprising:

encoding the incident data resulting from the encrypting into the characters by use of the Base64 encoding scheme; and adding the incident data from the encoding as a payload to the URL to the technical support server.

\* \* \* \* \*